(12) United States Patent
Kommera et al.

(10) Patent No.: US 10,394,696 B1
(45) Date of Patent: Aug. 27, 2019

(54) TESTING AN APPLICATION IN A PRODUCTION INFRASTRUCTURE TEMPORARILY PROVIDED BY A CLOUD COMPUTING ENVIRONMENT

(71) Applicant: Capital One Services, LLC, McLean, VA (US)

(72) Inventors: Raveender Kommera, Flower Mound, TX (US); Anoop Kunjuramanpillai, McKinney, TX (US); Karthik Gunapati, Irving, TX (US); Sahithya Javvaji, McKinney, TX (US); Leonardo Gomide, Dallas, TX (US); Daniel Tresnak, Frisco, TX (US); Anilkumar Baddula, Plano, TX (US); Nathan Gloier, Frisco, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/289,314

(22) Filed: Feb. 28, 2019

Related U.S. Application Data

(63) Continuation of application No. 16/113,756, filed on Aug. 27, 2018, now Pat. No. 10,223,242.

(51) Int. Cl.
*G06F 9/44* (2018.01)
*G06F 11/36* (2006.01)

(52) U.S. Cl.
CPC ...... *G06F 11/3664* (2013.01); *G06F 11/3684* (2013.01); *G06F 11/3688* (2013.01); *G06F 11/3692* (2013.01)

(58) Field of Classification Search
CPC ............................................ G06F 9/44
See application file for complete search history.

(56) References Cited

U.S. PATENT DOCUMENTS

| | | | |
|---|---|---|---|
| 5,684,946 A * | 11/1997 | Ellis | G06F 17/5022 714/33 |
| 8,418,000 B1 | 4/2013 | Salame et al. | |
| 9,329,915 B1 | 5/2016 | Chandrasekharapuram et al. | |
| 10,223,242 B1 | 3/2019 | Kommera et al. | |
| 2004/0044993 A1* | 3/2004 | Muller | G06F 11/3664 717/124 |
| 2005/0004682 A1* | 1/2005 | Gaddis | A01D 91/00 700/9 |
| 2008/0127094 A1* | 5/2008 | Squires | G06F 8/75 717/124 |

(Continued)

*Primary Examiner* — Jae U Jeon
(74) *Attorney, Agent, or Firm* — Harrity & Harrity, LLP

(57) ABSTRACT

A device receives test parameters associated with testing an application that utilizes source data, and causes source containers, for the source data, to be temporarily created in a cloud computing environment, based on the test parameters. The device provides the source data to the source containers in the cloud computing environment, and causes other containers, for the application, to be temporarily created in the cloud computing environment, based on the test parameters. The device creates a file for testing the application with the source containers and the other containers, based on the test parameters, and causes the application to be executed with the source containers and the other containers, based on the file. The device receives results associated with executing the application with the source containers and the other containers.

20 Claims, 14 Drawing Sheets

(56) References Cited

U.S. PATENT DOCUMENTS

2014/0026122 A1    1/2014   Markande et al.
2016/0314302 A1   10/2016   Sabetta et al.
2017/0212830 A1*   7/2017   Thomas .................... G06F 8/63
2018/0246745 A1*   8/2018   Aronovich .......... G06F 9/45545

* cited by examiner

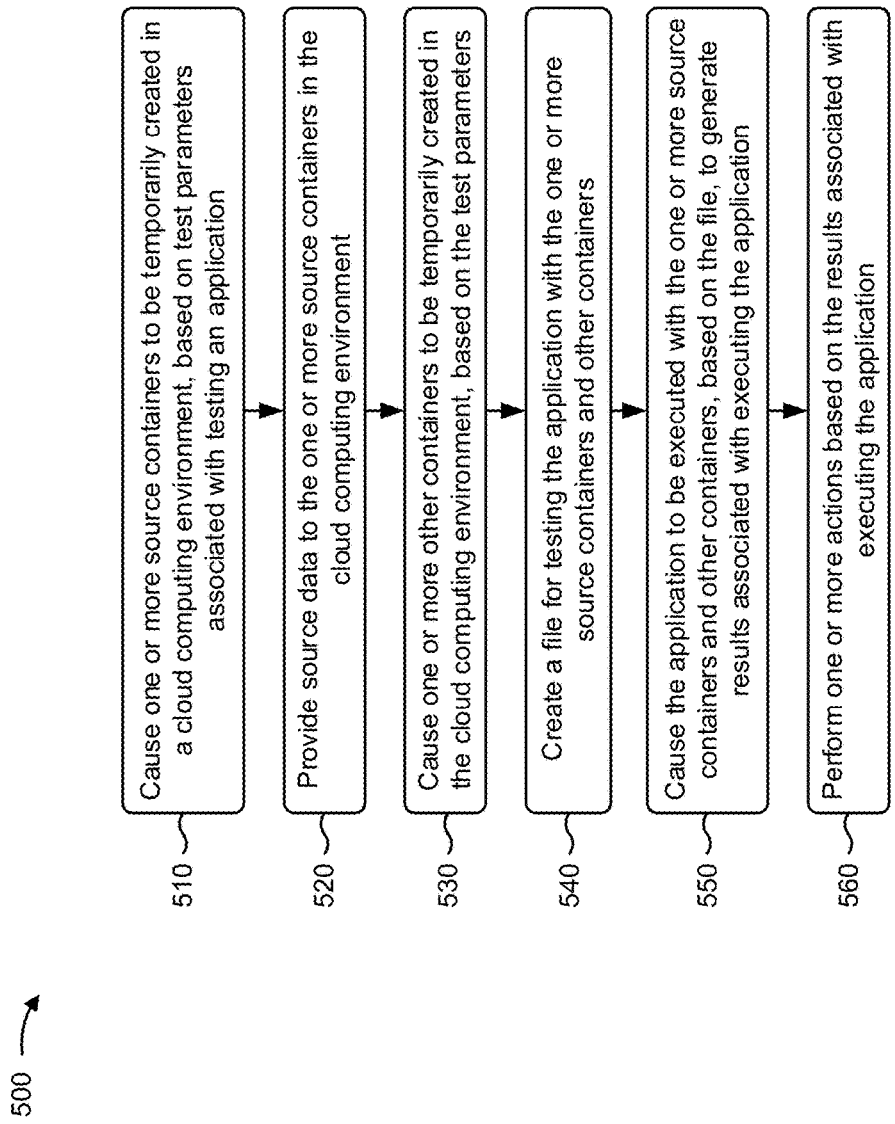

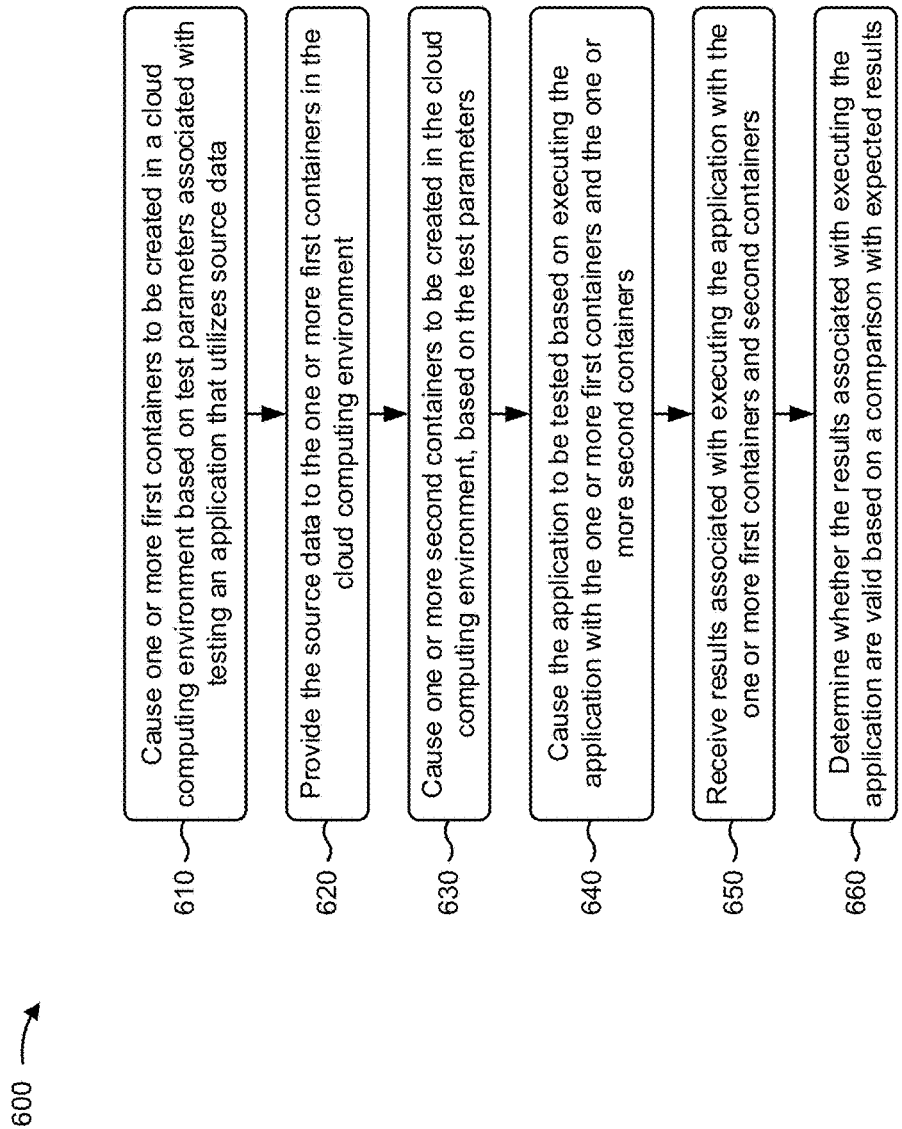

TESTING AN APPLICATION IN A PRODUCTION INFRASTRUCTURE TEMPORARILY PROVIDED BY A CLOUD COMPUTING ENVIRONMENT

RELATED APPLICATION

This application is a continuation of U.S. patent application Ser. No. 16/113,756, filed Aug. 27, 2018 (now U.S. Pat. No. 10,223,242), which is incorporated herein by reference.

BACKGROUND

An application is typically tested before the application is provided in a production infrastructure (e.g., a cloud computing environment, an enterprise environment, and/or the like). Testing an application under production infrastructure conditions requires expensive and impractical hardware installations. Therefore, many applications are tested with physical, scaled-down versions of the production infrastructure during development and quality testing.

SUMMARY

According to some implementations, a device may include one or more memories, and one or more processors, communicatively coupled to the one or more memories, to receive test parameters associated with testing an application that utilizes source data. The one or more processors may cause one or more source containers, for the source data, to be temporarily created in a cloud computing environment, based on the test parameters, and may provide the source data to the one or more source containers in the cloud computing environment. The one or more processors may cause one or more other containers, for the application, to be temporarily created in the cloud computing environment, based on the test parameters, and may create a file for testing the application with the one or more source containers and the one or more other containers, based on the test parameters. The one or more processors may cause the application to be executed with the one or more source containers and the one or more other containers, based on the file, and may receive results associated with executing the application with the one or more source containers and the one or more other containers.

According to some implementations, a non-transitory computer-readable medium may store instructions that include one or more instructions that, when executed by one or more processors of a device, cause the one or more processors to cause one or more source containers, for source data, to be temporarily created in a cloud computing environment, based on test parameters associated with testing an application that utilizes the source data. The one or more instructions may cause the one or more processors to provide the source data to the one or more source containers in the cloud computing environment, and cause one or more other containers, for the application, to be temporarily created in the cloud computing environment, based on the test parameters. The one or more instructions may cause the one or more processors to create a file for testing the application with the one or more source containers and the one or more other containers, based on the test parameters, and cause the application to be executed with the one or more source containers and the one or more other containers, based on the file, to generate results associated with executing the application. The one or more instructions may cause the one or more processors to perform one or more actions based on the results associated with executing the application.

According to some implementations, a method may include causing one or more first containers, for source data, to be created in a cloud computing environment, based on test parameters associated with testing an application that utilizes the source data, and providing the source data to the one or more first containers in the cloud computing environment. The method may include causing one or more second containers, for the application, to be created in the cloud computing environment, based on the test parameters, and causing the application to be tested based on executing the application with the one or more first containers and the one or more second containers. The method may include receiving results associated with executing the application with the one or more first containers and the one or more second containers, and determining whether the results associated with executing the application are valid based on a comparison with expected results.

BRIEF DESCRIPTION OF THE DRAWINGS

FIG. 5 is a flow chart of an example process for testing an application in a production infrastructure temporarily provided by a cloud computing environment.

FIG. 6 is a flow chart of an example process for testing an application in a production infrastructure temporarily provided by a cloud computing environment.

DETAILED DESCRIPTION

The following detailed description of example implementations refers to the accompanying drawings. The same reference numbers in different drawings may identify the same or similar elements.

An application is typically tested before the application is provided in a production infrastructure, and many applications are tested with physical, scaled-down versions of the production infrastructure during development and quality testing. The physical, scaled-down versions of the production infrastructure may be paid for irrespective of usage for testing the application, which unnecessarily increases testing costs. Furthermore, current testing procedures require manual loading of test data for each individual test case, manual verification or validation of test case test results captured and manually verified before signing off the functionality, and/or the like. Such manual procedures increase costs for testing an application, are error prone, and are time consuming.

Some implementations described herein provide a testing platform that tests an application in a production infrastructure temporarily provided by a cloud computing environment. For example, the testing platform may receive test parameters associated with testing an application that utilizes source data, and may cause source containers, for the source data, to be temporarily created in a cloud computing environment, based on the test parameters. The testing platform may provide the source data to the source containers in the cloud computing environment, and may cause other containers, for the application, to be temporarily created in the cloud computing environment, based on the test parameters. The testing platform may create a file for testing the application with the source containers and the other containers, based on the test parameters, and may cause the application to be executed with the source containers and the other containers, based on the file. The testing platform may receive results associated with executing the application with the source containers and the other containers.

Figure 1A:
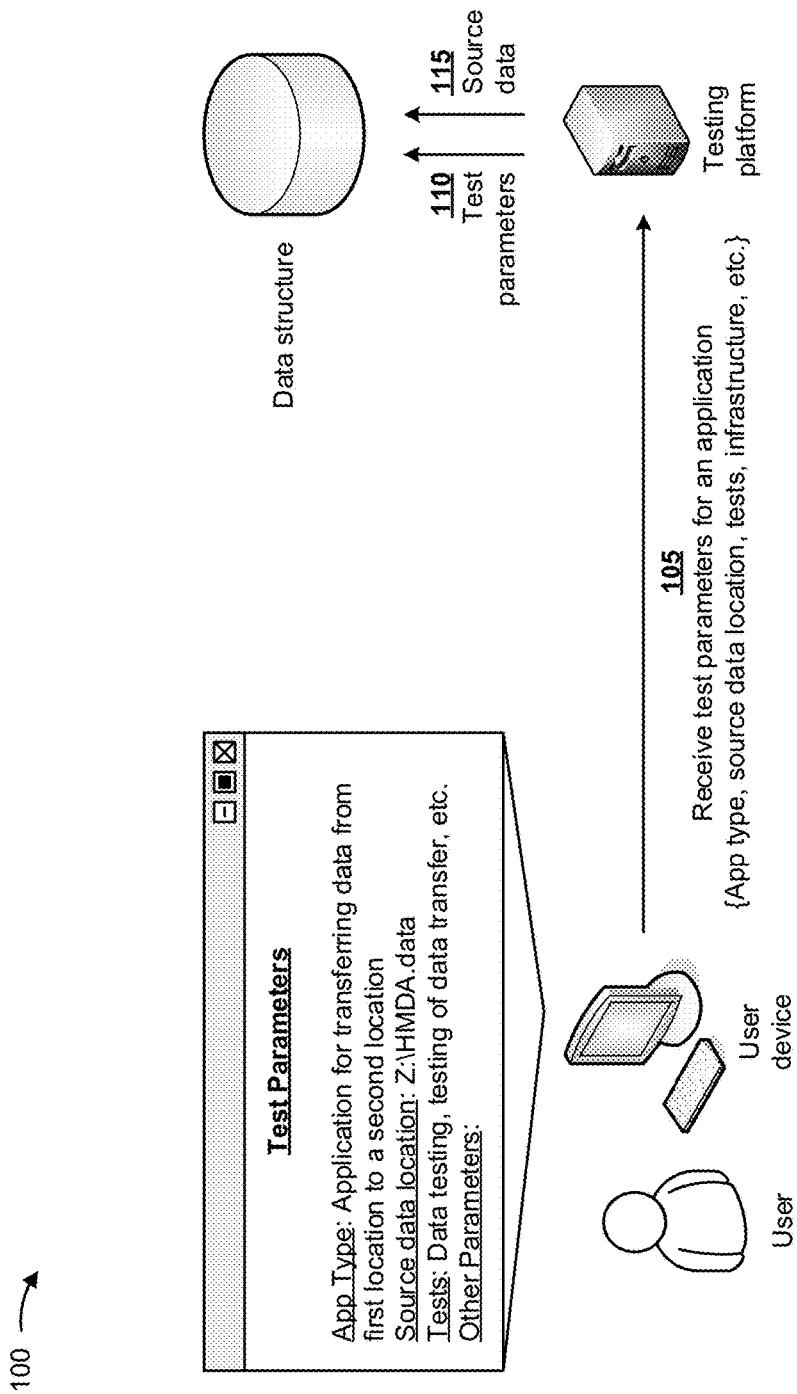
FIGS. 1A-1I are diagrams of an example implementation described herein.

FIGS. 1A-1I are diagrams of an example implementation 100 described herein. As shown in FIG. 1A, a user device may be associated with a testing platform. A user of the user device may provide, to the user device, test parameters for testing an application to be implemented in a physical production infrastructure. In some implementations, the user may wish to test the application without utilizing a physical production infrastructure since the physical production infrastructure is expensive to purchase, may be unavailable for testing purposes, and/or the like. In some implementations, the test parameters may include parameters indicating an application type (e.g., an application for transferring data from a first memory location to a second memory location, a micro-service application, and/or the like), a location (e.g., in memory) of the application (e.g., Y:\HMDA.app), a source data location (e.g., in memory) of source data (e.g., Z:\HMDA.data), one or more tests to perform on the application (e.g., data testing, testing of data transfer, etc.), a list of physical infrastructure to be temporarily simulated for testing the application, other parameters, and/or the like. In some implementations, the source data may include data to be utilized by the application when the application is implemented in the physical production infrastructure.

In some implementations, the user may cause the user device to provide the test parameters to the testing platform. As shown in FIG. 1A, and by reference number 105, the testing platform may receive the test parameters from the user device. In some implementations, one or more of the test parameters may be automatically generated by the testing platform based on the application, the source data, and/or the like.

As further shown in FIG. 1A, and by reference number 110, the testing platform may store the test parameters in a data structure associated with the testing platform. In some implementations, the data structure may include a database, a table, a linked list, a tree, and/or the like. In some implementations, the testing platform may receive the source data and/or the application from the source data location and/or the location of the application (e.g., identified in the test parameters), respectively. As further shown in FIG. 1A, and by reference number 115, the testing platform may store the source data and/or the application in the data structure.

Figure 1B:
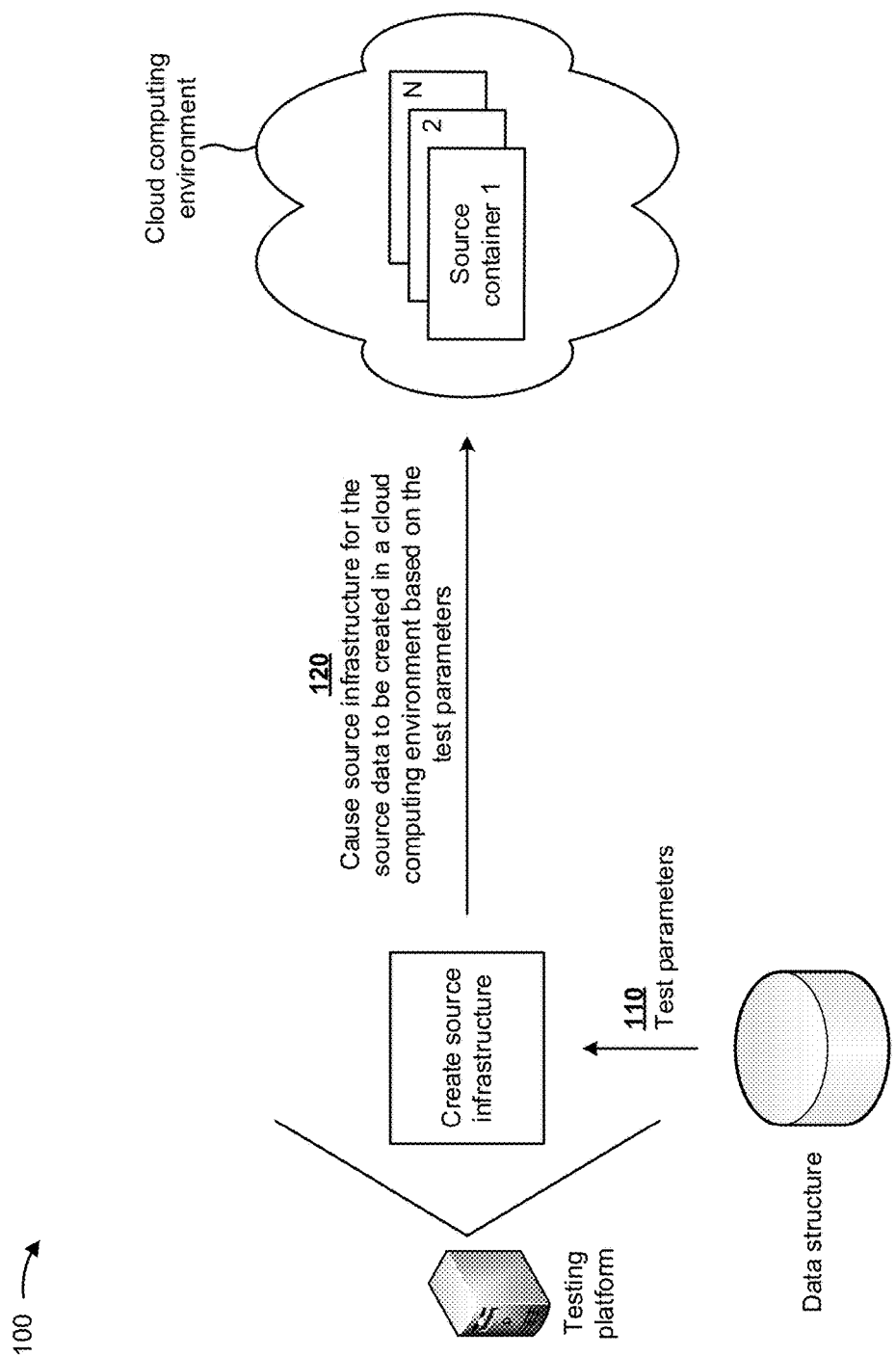

As shown in FIG. 1B, and by reference numbers 110 and 120, the testing platform may cause a source infrastructure (e.g., virtual storage, virtual memory devices, and/or the like) for the source data to be temporarily created in a cloud computing environment based on the test parameters. In some implementations, the cloud computing environment may provide one or more containers for different services provided by the cloud computing environment. In some implementations, a container may include a stand-alone, executable package of software that includes everything needed for execution (e.g., code, runtime tools, system tools, system libraries, settings, and/or the like). A container may isolate software from surroundings and may reduce conflicts between users executing different software in a same cloud computing environment. In some implementations, multiple containers may execute on the same computing device, and may share an operating system kernel with other containers.

In some implementations, the testing platform may cause the cloud computing environment to provide the source infrastructure via one or more source containers and based on the test parameters. For example, if the test parameters identify source data of a particular size (e.g., fifty gigabytes (Gb)), the testing platform may cause the cloud computing environment to create enough source containers to store the source data of the particular size. In such an example, if each source container is configured to store ten Gb of data, the cloud computing environment may create five source containers (e.g., at ten Gb each) to store the fifty Gb of the source data.

In some implementations, the testing platform may cause the cloud computing environment to temporarily create the source infrastructure for the source data by providing, to the cloud computing environment, information (e.g., an instruction) instructing the cloud computing environment to create the source infrastructure (e.g., the one or more source containers) for the source data in the cloud computing environment. The cloud computing environment may receive the instruction, and may create the source infrastructure (e.g., the one or more source containers) for the source data based on the instruction. For example, as further shown in FIG. 1B, the cloud computing environment may create a quantity (e.g., N≥1) of the source containers in the cloud computing environment based on the instruction. In some implementations, the cloud computing environment may create more or fewer source containers than depicted in FIG. 1B.

Figure 1C:
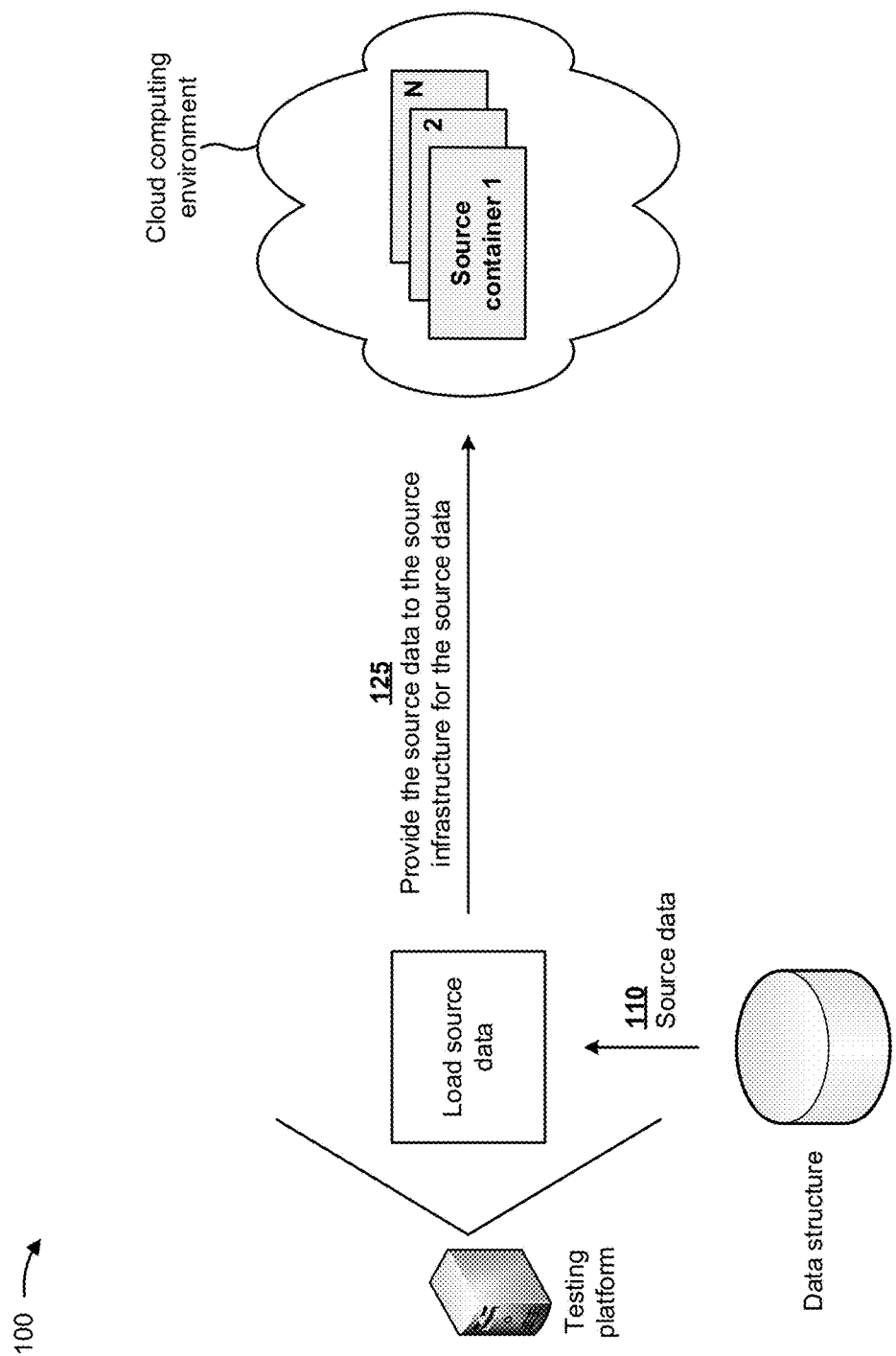

As shown in FIG. 1C, and by reference numbers 110 and 125, the testing platform may provide the source data, from the data structure, to the source infrastructure for the source data. In some implementations, the testing platform may provide the source data to the source infrastructure by providing, to the cloud computing environment, the source data and information (e.g., an instruction) instructing the cloud computing environment to provide the source data to the source infrastructure (e.g., the one or more source containers). The cloud computing environment may receive the source data and the instruction, and may provide the source data to the source infrastructure (e.g., the one or more source containers) based on the instruction. For example, as further shown in FIG. 1C, the cloud computing environment may provide the source data to the quantity of the source containers in the cloud computing environment based on the instruction. In some implementations, the cloud computing environment may store a first portion of the source data in a first source container until the first source container is at capacity, may store a second portion of the source data in a second container until the second container is at capacity, and/or the like. In some implementations, the cloud computing environment may evenly (or approximately evenly) distribute the source data in the source containers.

Figure 1D:
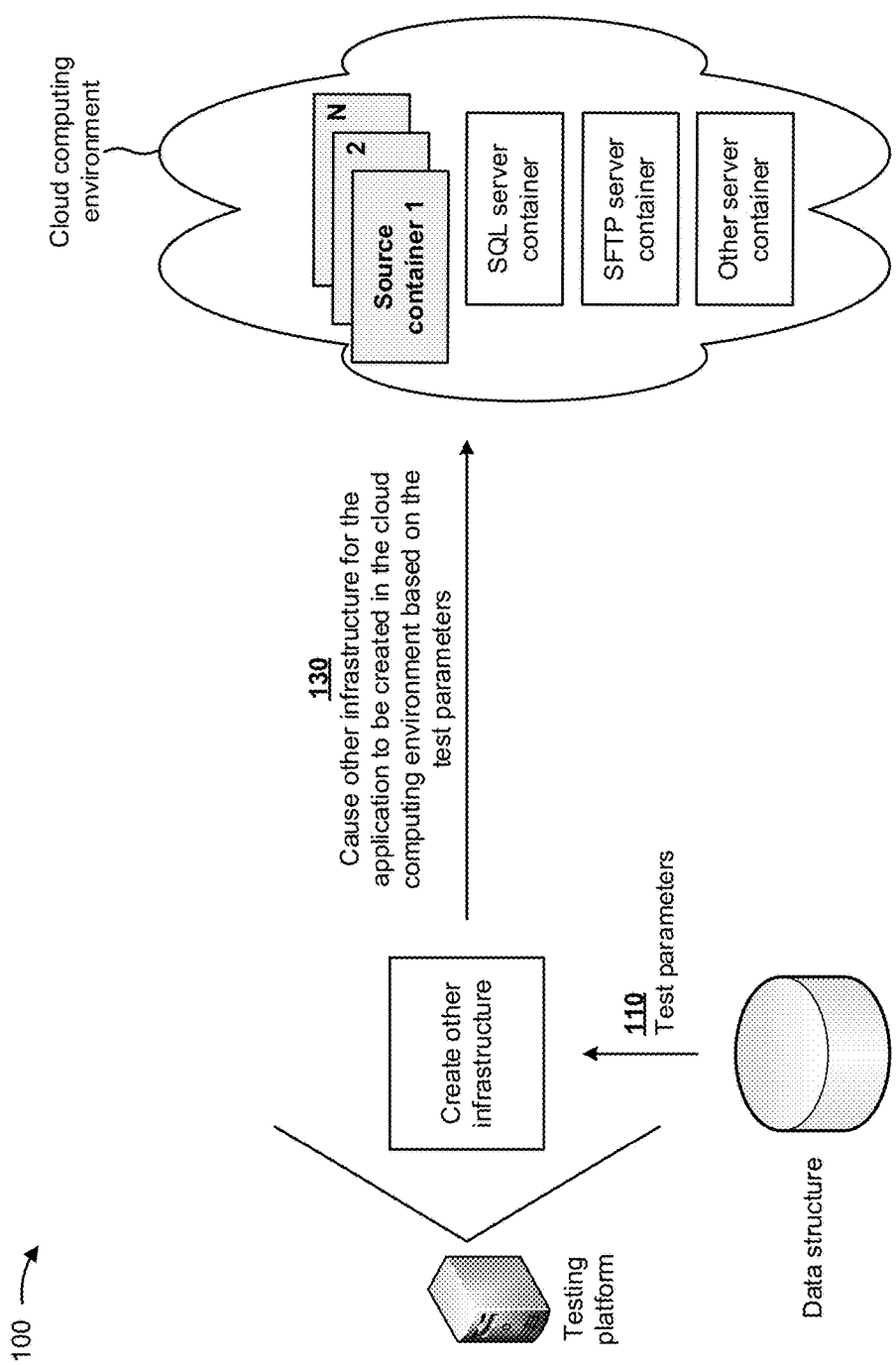

As shown in FIG. 1D, and by reference number 110 and 130, the testing platform may cause other infrastructure for the application to be created in the cloud computing environment based on the test parameters. In some implementations, the testing platform may cause the cloud computing environment to provide the other infrastructure via one or more other containers and based on the test parameters. For example, if the test parameters indicate that the application utilizes a structured query language (SQL) server, a secure file transfer protocol (SFTP) server, another server, and/or the like to execute the application, the testing platform may cause the cloud computing environment to create a container to represent the SQL server, a container to represent the SFTP server, a container to represent the other server, and/or the like.

In some implementations, the testing platform may cause the other infrastructure for the application to be created in the cloud computing environment by providing, to the cloud computing environment, information (e.g., an instruction) instructing the cloud computing environment to create the other infrastructure for the application in the cloud computing environment. The cloud computing environment may receive the instruction, and may create the other infrastructure for the application in the cloud computing environment based on the instruction. For example, as further shown in FIG. 1D, the cloud computing environment may create a SQL server container, a SFTP server container, another server container, and/or the like, based on the instruction. The cloud computing environment may utilize one or more containers to simulate functions performed by a SQL server device, a SFTP server device, another server device, and/or the like. In some implementations, the cloud computing environment may include different, more, or fewer containers than depicted in FIG. 1D.

Figure 1E:
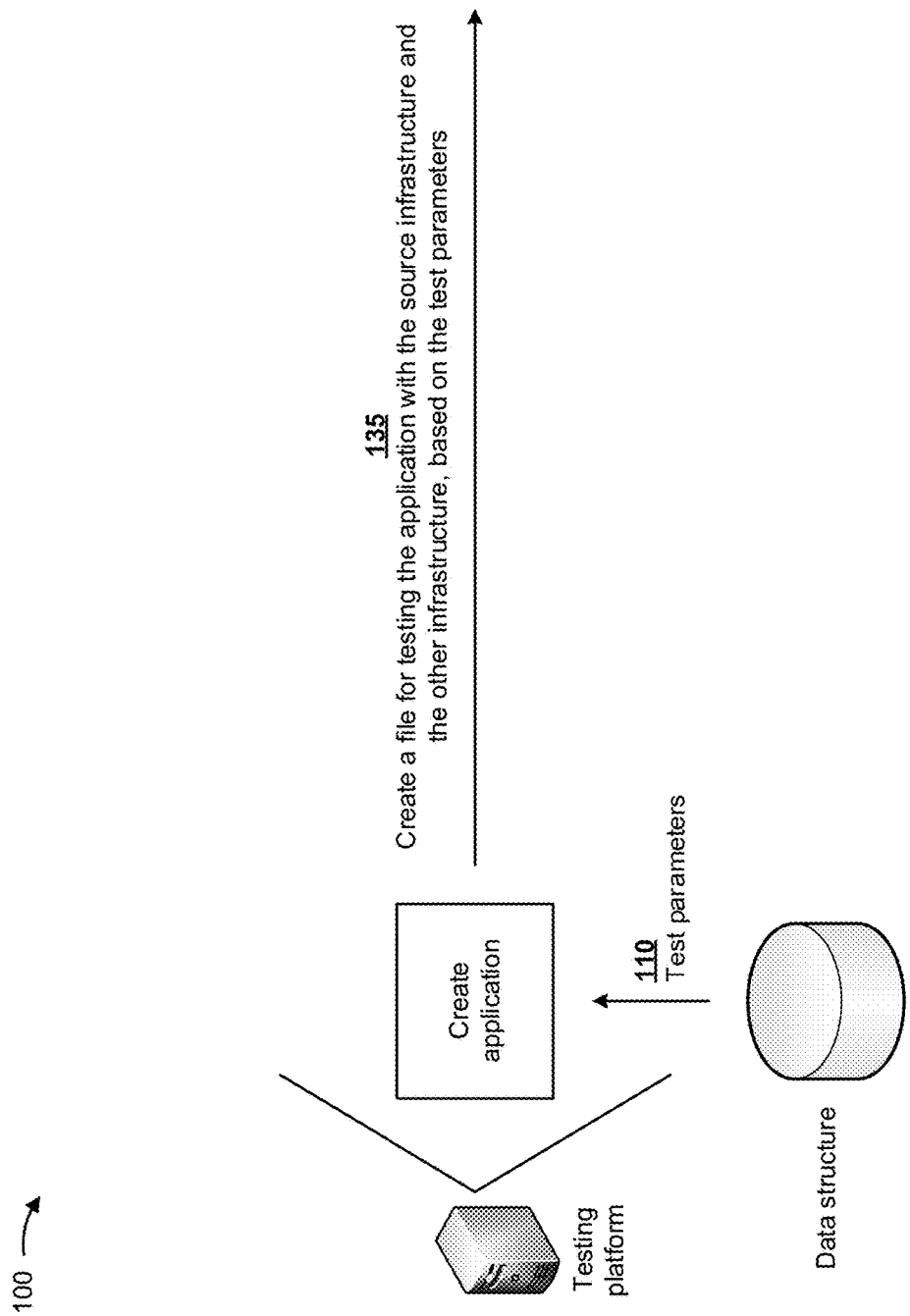

As shown in FIG. 1E, and by reference numbers 110 and 135, the testing platform may create a file for testing the application with the source infrastructure and the other infrastructure based on the test parameters. In some implementations, the testing platform may create a file that causes the cloud computing environment to test the application with the one or more source containers and the one or more other containers based on the test parameters. For example, if the test parameters indicate that the application is to be tested for error generation during execution, the testing platform may create a file the causes the cloud computing environment to track errors generated by the application during execution, via the one or more source containers and the one or more other containers. In some implementations, the file may include a configuration file that identifies locations of the one or more source containers and the one or more other containers in the cloud computing environment. The configuration file may include information for implementing the test parameters with the application, such as information indicating the one or more tests to perform on the application, the source data to utilize with the one or more tests, execution parameters for the application, and/or the like.

In some implementations, the testing platform may store files for performing certain tests on applications, may select one or more of the files, and may modify the one or more of the files for a particular application. In some implementations, the testing platform may utilize artificial intelligence techniques select the best tests for applications based on past performance associated with the best tests. The artificial intelligence techniques may utilize information about a type of application being tested and a type of test to be performed, and may select one or more files that are capable of performing the type of test on the type of application. The selected one or more files may then be modified for the particular application and the created containers.

Figure 1F:
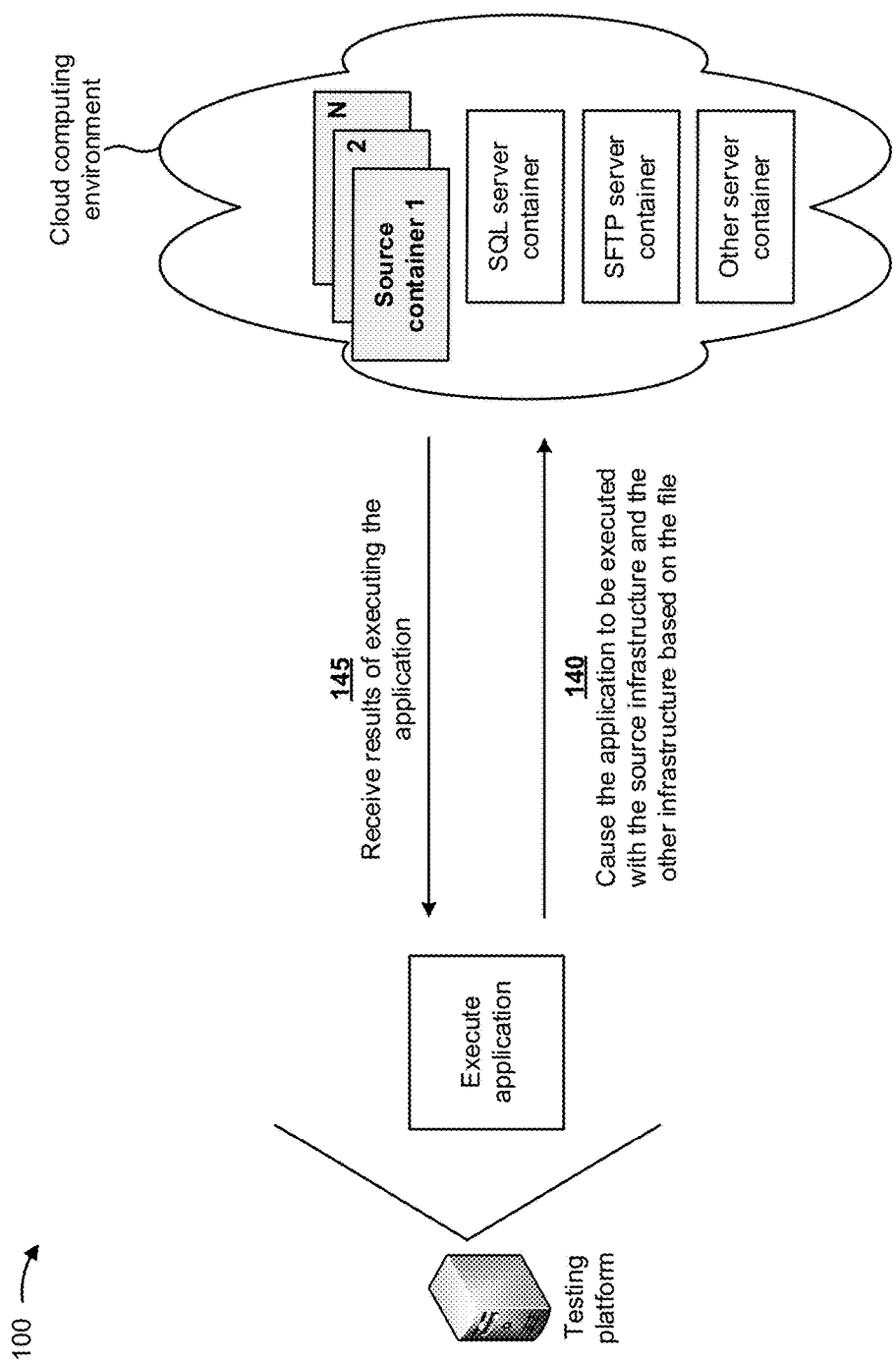

As shown in FIG. 1F, and by reference number 140, the testing platform may cause the application to be executed with the source infrastructure and the other infrastructure, based on the file. In some implementations, the testing platform may cause the cloud computing environment to execute the file, and execution of the file may cause the cloud computing environment to execute the application with the source data and via the one or more source containers and the one or more other containers, to perform the one or more tests on the application, and/or the like. In some implementations, the testing platform may cause the application to be executed with the source infrastructure and the other infrastructure by providing, to the cloud computing environment, information (e.g., an instruction) instructing the cloud computing environment to execute the file. The cloud computing environment may receive the instruction, and may execute the file. When the cloud computing environment executes the file, the execution of the file may cause the cloud computing environment to execute the application with the source data and via the one or more source containers and the one or more other containers, to perform the one or more tests on the application, and/or the like.

As further shown in FIG. 1F, and by reference number 145, the testing platform may receive, from the cloud computing environment, results of executing the application. In some implementations, the cloud computing environment (e.g., the one or more source containers and the one or more other containers) may generate the results, and may provide the results to the testing platform. In some implementations, the results may include information indicating errors generated by the application during execution, loads encountered by the one or more source containers and/or the one or more other containers during execution of the application, resource utilization during execution of the application (e.g., processor resources, memory resources, and/or the like associated with the containers), a quantity of time to execute the application, and/or the like.

Figure 1G:
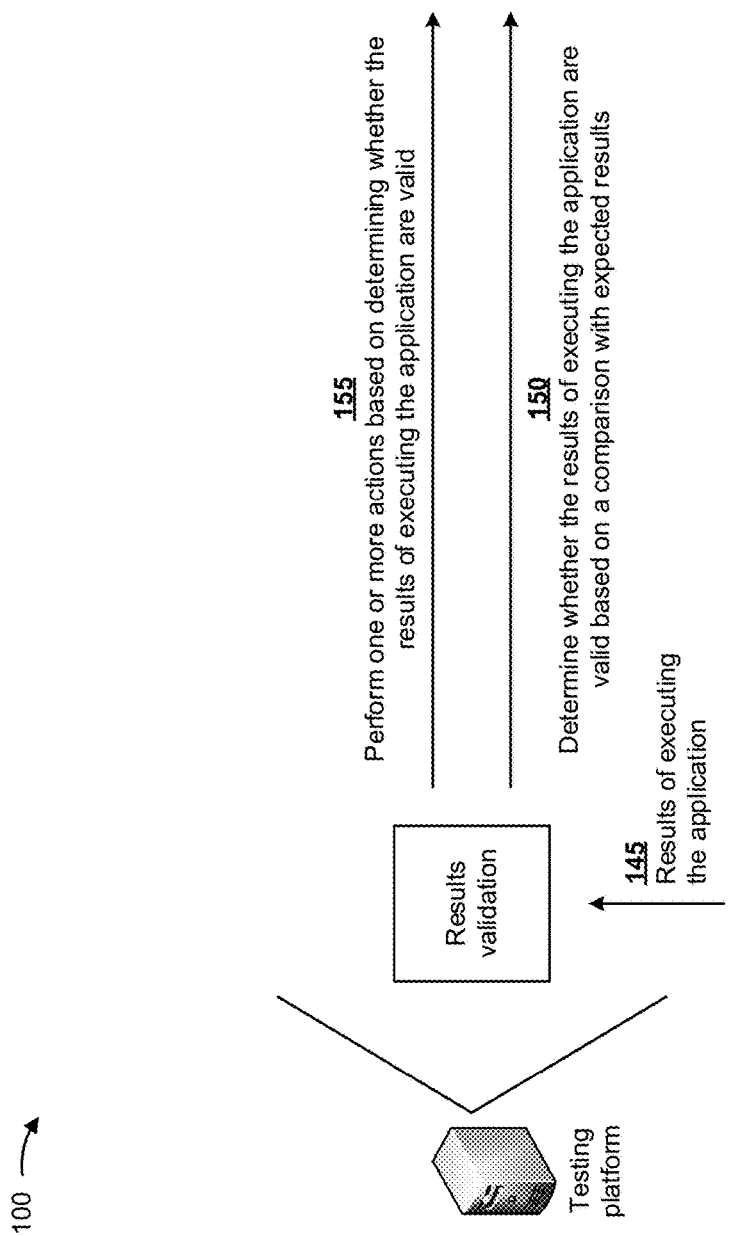

As shown in FIG. 1G, and by reference numbers 145 and 150, the testing platform may determine whether the results of executing the application are valid based on a comparison with expected results (e.g., results received from similar prior tests with similar applications). In some implementations, the testing platform may determine that the results are valid when the results indicate that no errors were generated by the application during execution, that loads encountered by the one or more source containers and/or the one or more other containers during execution of the application are substantially equivalent to expected loads encountered by the one or more source containers and/or the one or more other containers, that resource utilization during execution of the application is substantially equivalent to expected resource utilization, that the quantity of time to execute the application is substantially equivalent to an expected quantity of time, and/or the like.

In some implementations, the testing platform may determine that the results are invalid when the results indicate that one or more errors were generated by the application during execution, that loads encountered by the one or more source containers and/or the one or more other containers during execution of the application are not substantially equivalent to expected loads encountered by the one or more source containers and/or the one or more other containers, that resource utilization during execution of the application is not substantially equivalent to expected resource utilization, that the quantity of time to execute the application is not substantially equivalent to an expected quantity of time, that one or more portions of the application did not execute, and/or the like.

As further shown in FIG. 1G, and by reference number 155, the testing platform may perform one or more actions based on determining whether the results of executing the application are valid. In some implementations, if the results of executing the application are valid, the testing platform may perform actions, such as providing, for display, information indicating that the results of executing the application are valid, notifying one or more users (e.g., via email, instant message, voicemail, a telephone call, and/or the like) that the results of executing the application are valid, compiling the application for use in a physical production infrastructure, causing the source infrastructure and other infrastructure to be removed from the cloud computing environment (e.g., to save costs), and/or the like.

In some implementations, if the results of executing the application are invalid, the testing platform may perform actions, such as providing, for display, information indicating that the results of executing the application are invalid, notifying one or more users that the results of executing the application are invalid, identifying one or more errors in the application, recommending modifications to the application to correct the errors (e.g., recommending modification, replacement, deletion, and/or the like of one or more portions of the application that generate the errors), identifying overloading of the one or more source containers and/or the one or more other containers, recommending modifications to the application to correct the overloading (e.g., recommending modification, replacement, deletion, and/or the like of one or more portions of the application that generate the overloading), identifying resource over-utilization during execution of the application, recommending modifications to the application to correct the over-utilization, identifying an unexpected quantity of time to execute the application, recommending modifications to the application to correct the unexpected quantity of time (e.g., recommending modification, replacement, deletion, and/or the like of one or more portions of the application that generate the unexpected quantity of time), and/or the like. In this way, the testing platform may automatically perform actions that improve the application, reduce time and resource utilization associated with testing the application, and/or the like.

Figure 1H:
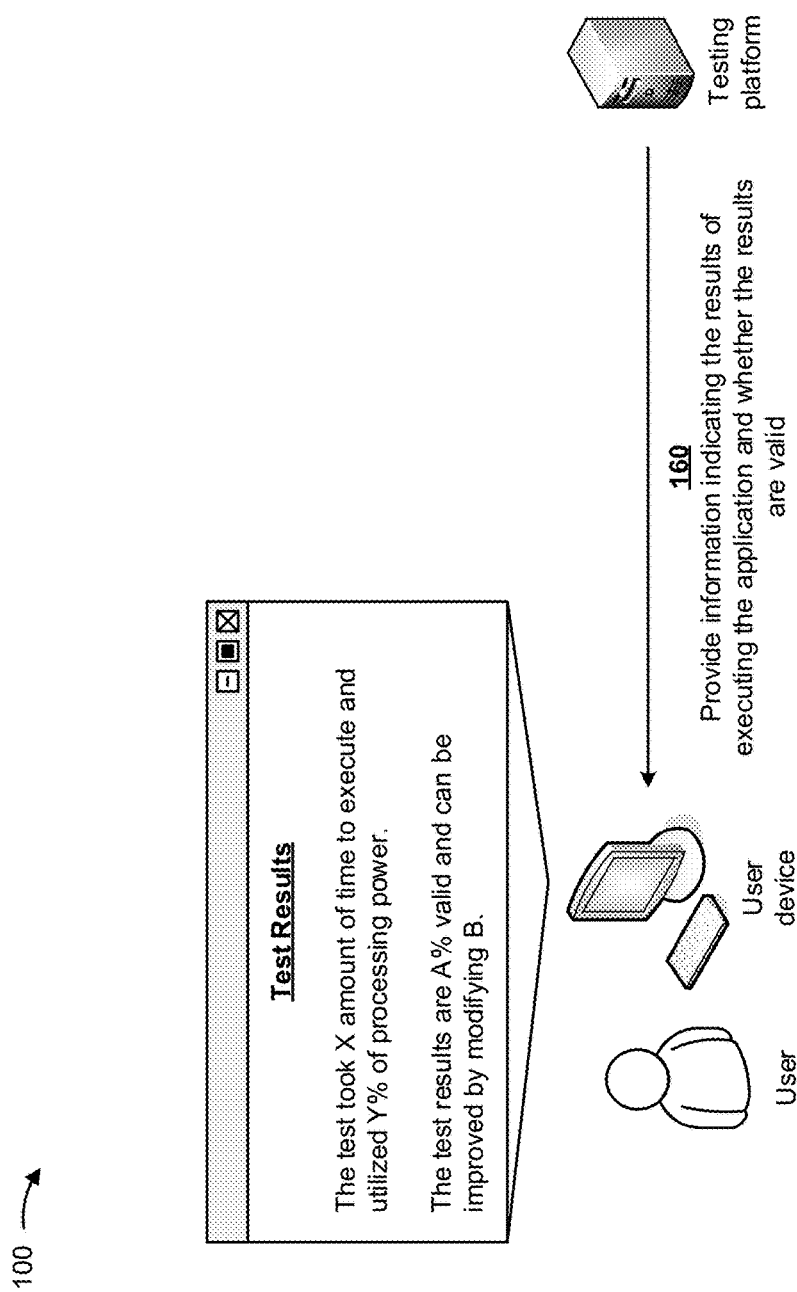

As shown in FIG. 1H, and by reference number 160, the testing platform may provide, to a user device, information indicating the results of executing the application and whether the results are valid. In some implementations, the testing platform may provide, to the user device, the information indicating the results of executing the application and whether the results are valid when the testing of the application is completed by the testing platform, during testing of the application, upon request from a user of the user device, periodically (e.g., every minute, every fifteen minutes, hourly, etc.), and/or the like.

In some implementations, the user device may display the information indicating the results of executing the application and whether the results are valid to the user via a user interface. For example, the user interface may display information indicating that the test took X amount of time to execute and utilized Y % of processing power, that the test results are A % valid and can be improved by modifying B (e.g., a portion of the application), that the application is ready for production, and/or the like.

Figure 1I:
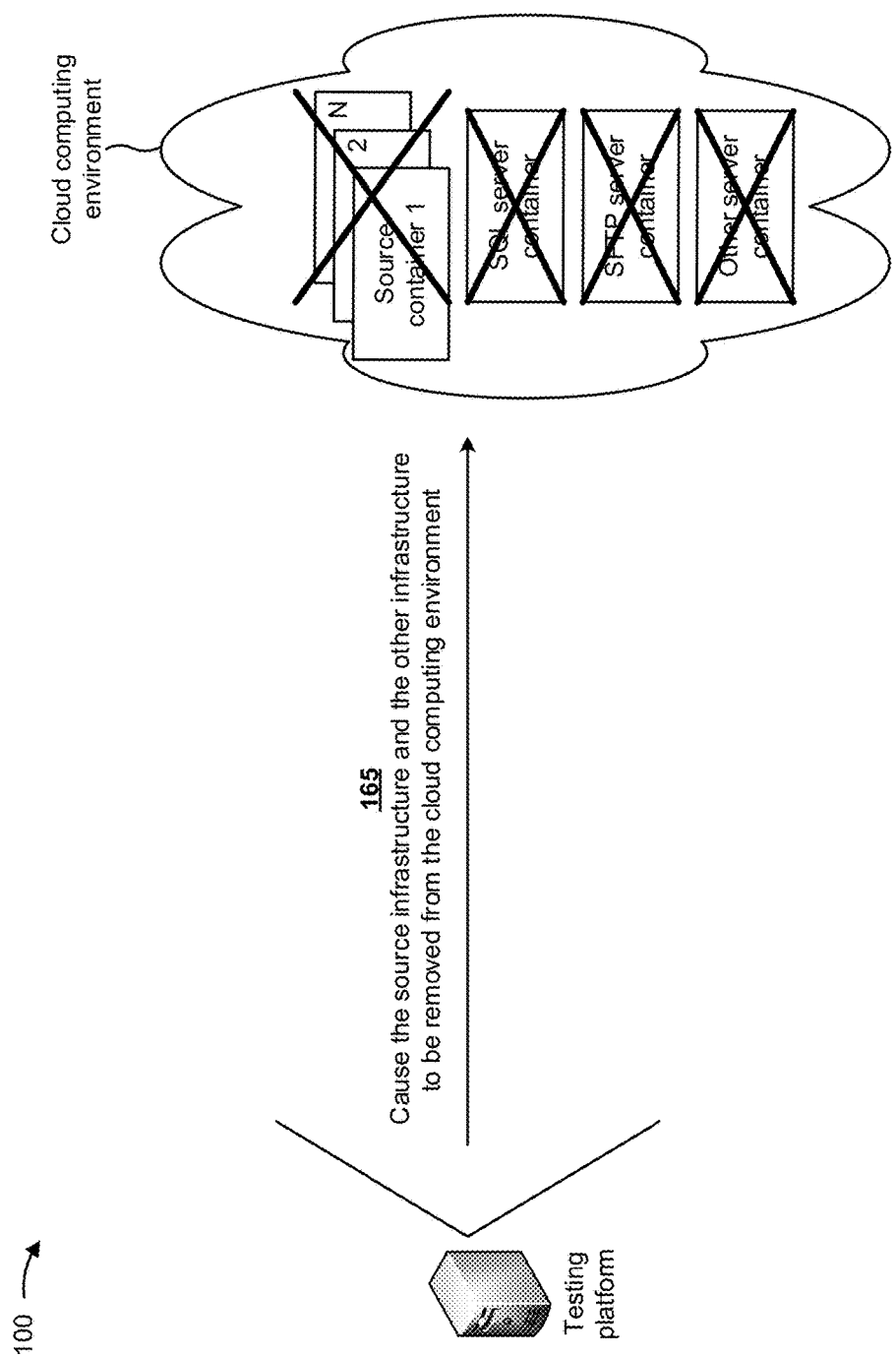

As shown in FIG. 1I, and by reference number 165, the testing platform may cause the source infrastructure and the other infrastructure to be removed from the cloud computing environment. In some implementations, the testing platform may cause the cloud computing environment to remove the source infrastructure and the other infrastructure from the cloud computing environment by providing, to the cloud computing environment, information (e.g., an instruction) instructing the cloud computing environment to remove the source infrastructure (e.g., the one or more source containers) and the other infrastructure (e.g., the one or more other containers) from the cloud computing environment. The cloud computing environment may receive the instruction, and may remove the source infrastructure (e.g., the one or more source containers) and the other infrastructure (e.g., the one or more other containers) based on the instruction. For example, as further shown in FIG. 1I, the cloud computing environment may remove the source containers and the other containers (e.g., the SQL server container, the SFTP server container, and the other server container) from the cloud computing environment based on the instruction. In this way, the resources of the cloud computing environment may be used for testing the application, and may be removed upon completion of the testing in order to save costs and resource utilization.

In this way, several different stages of the process for testing an application in a production infrastructure temporarily provided by a cloud computing environment are automated, which may remove human subjectivity and waste from the process, and which may improve speed and efficiency of the process and conserve computing resources (e.g., processing resources, memory resources, and/or the like). Furthermore, implementations described herein use a rigorous, computerized process to perform tasks or roles that were not previously performed or were previously performed using subjective human intuition or input. For example, currently there does not exist a technique that automatically tests an application in a production infrastructure temporarily provided by a cloud computing environment. Finally, automating the process for testing an application in a production infrastructure temporarily provided by a cloud computing environment conserves computing resources (e.g., processing resources, memory resources, and/or the like) associated with the cloud computing environment and that would otherwise be wasted in attempting to test the application with physical, scaled-down versions of a production infrastructure.

As indicated above, FIGS. 1A-1I are provided merely as examples. Other examples are possible and may differ from what was described with regard to FIGS. 1A-1I.

Figure 2:
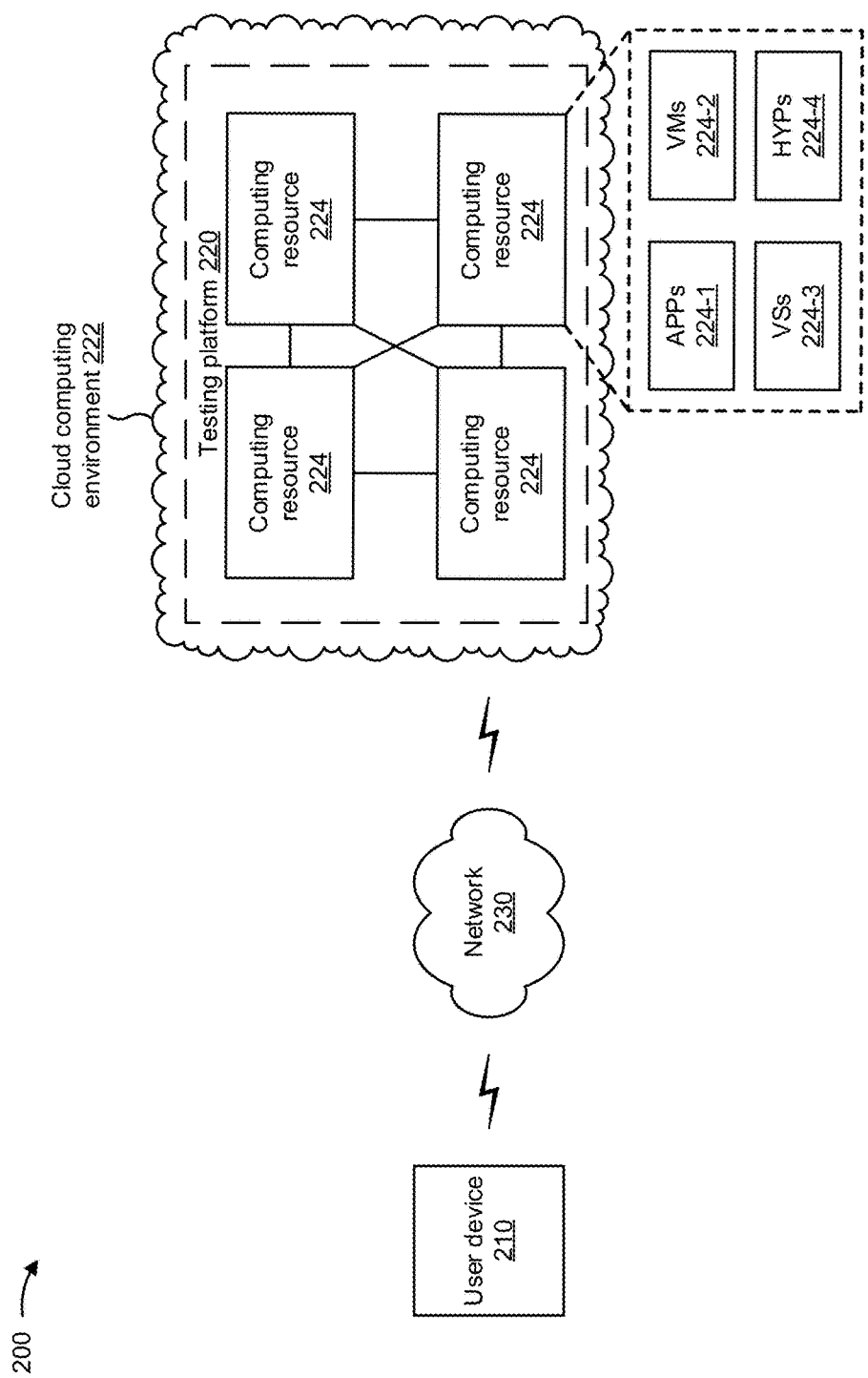
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a testing platform 220, and a network 230. Devices of environment 200 may interconnect via wired connections, wireless connections, or a combination of wired and wireless connections.

User device 210 includes one or more devices capable of receiving, generating, storing, processing, and/or providing information, such as information described herein. For example, user device 210 may include a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), or a similar type of device. In some implementations, user device 210 may receive information from and/or transmit information to testing platform 220.

Testing platform 220 includes one or more devices that test an application in a production infrastructure temporarily provided by a cloud computing environment. In some implementations, testing platform 220 may be designed to be modular such that certain software components may be swapped in or out depending on a particular need. As such, testing platform 220 may be easily and/or quickly reconfigured for different uses. In some implementations, testing platform 220 may receive information from and/or transmit information to one or more user devices 210.

In some implementations, as shown, testing platform 220 may be hosted in a cloud computing environment 222. Notably, while implementations described herein describe testing platform 220 as being hosted in cloud computing environment 222, in some implementations, testing platform 220 may not be cloud-based (i.e., may be implemented outside of a cloud computing environment) or may be partially cloud-based.

Cloud computing environment 222 includes an environment that hosts testing platform 220. Cloud computing environment 222 may provide computation, software, data access, storage, etc. services that do not require end-user knowledge of a physical location and configuration of system(s) and/or device(s) that host testing platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host testing platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by user device 210. Application 224-1 may eliminate a need to install and execute the software applications on user device 210. For example, application 224-1 may include software associated with testing platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., a user of user device 210 or an operator of testing platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
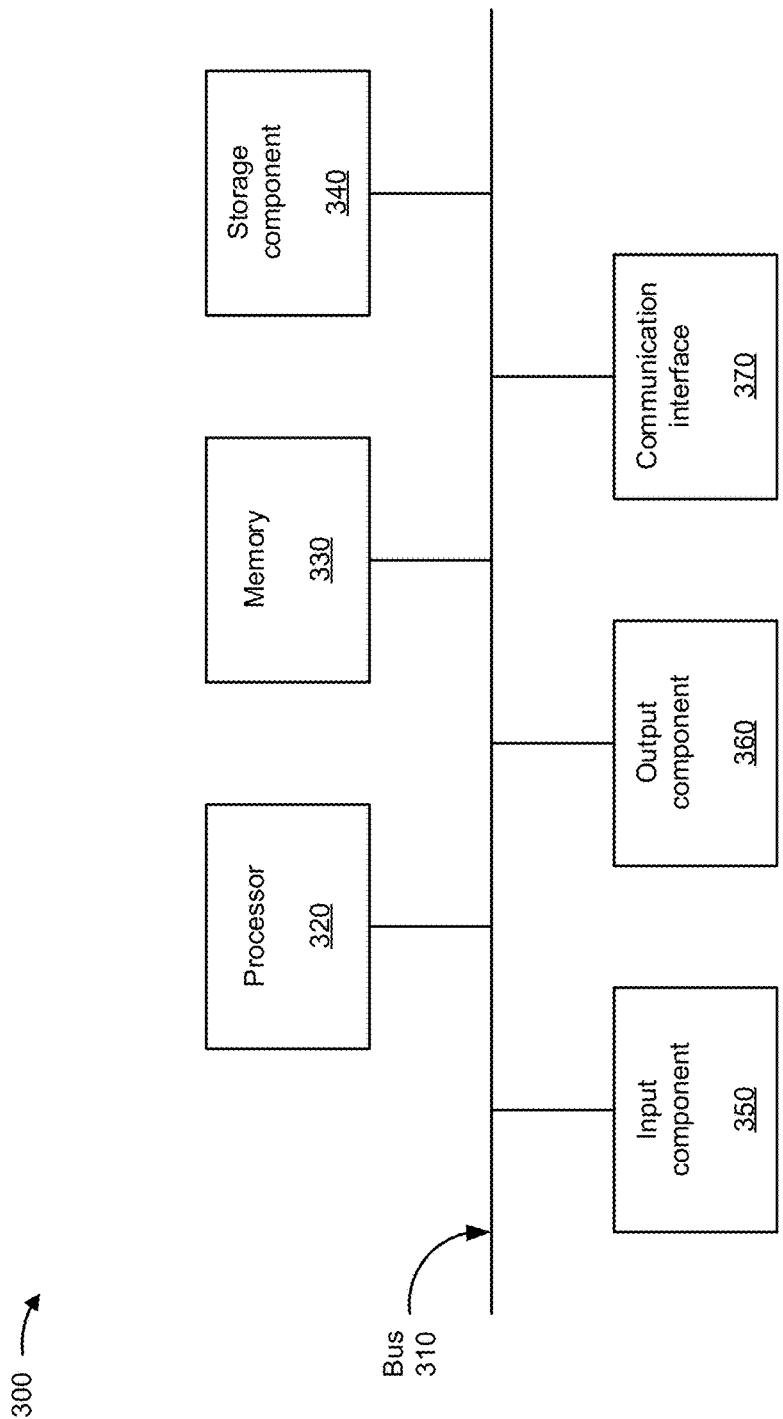
FIG. 3 is a diagram of example components of one or more devices of FIG. 2.

FIG. 3 is a diagram of example components of a device 300. Device 300 may correspond to user device 210, testing platform 220, and/or computing resource 224. In some implementations, user device 210, testing platform 220, and/or computing resource 224 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
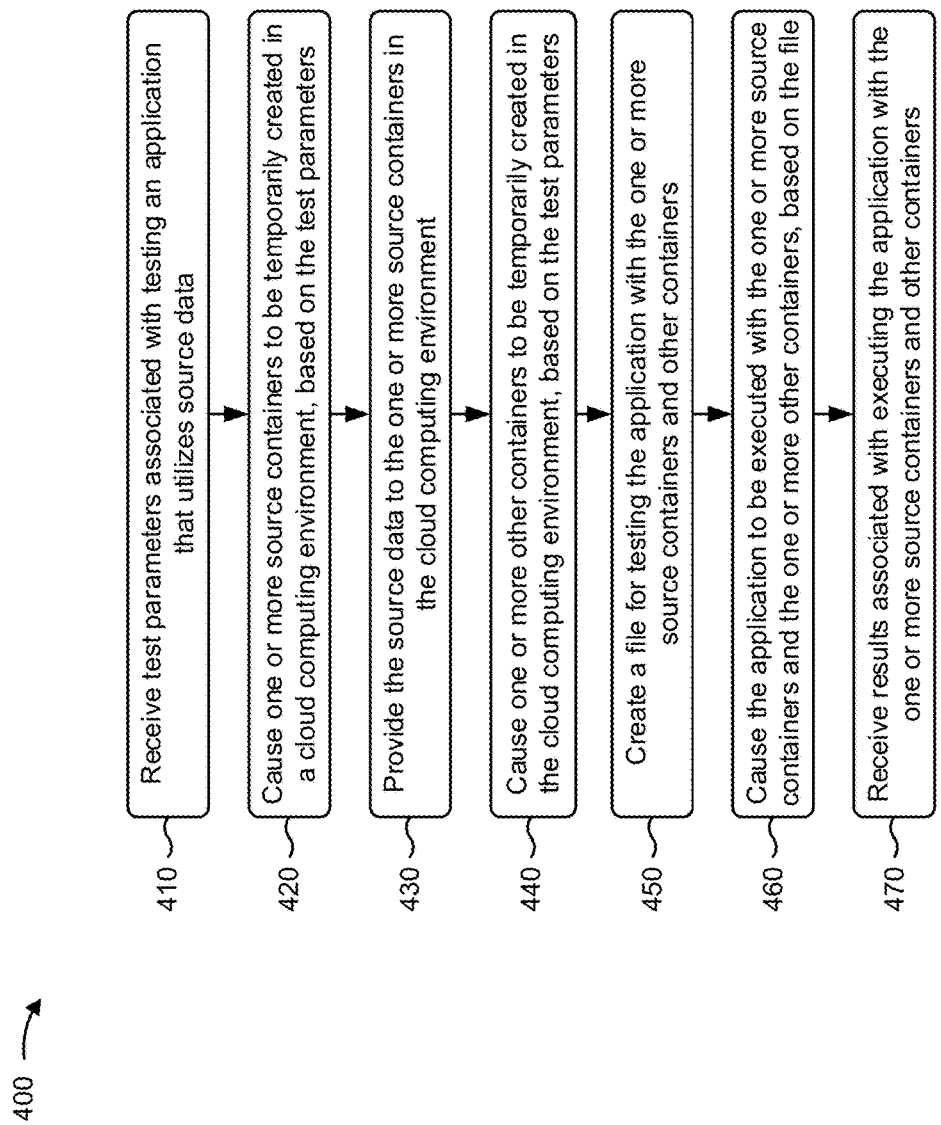
FIG. 4 is a flow chart of an example process for testing an application in a production infrastructure temporarily provided by a cloud computing environment.

FIG. 4 is a flow chart of an example process 400 for testing an application in a production infrastructure temporarily provided by a cloud computing environment. In some implementations, one or more process blocks of FIG. 4 may be performed by a testing platform (e.g., testing platform 220). In some implementations, one or more process blocks of FIG. 4 may be performed by another device or a group of devices separate from or including the testing platform, such as a user device (e.g., user device 210).

As shown in FIG. 4, process 400 may include receiving test parameters associated with testing an application that utilizes source data (block 410). For example, the testing platform (e.g., using computing resource 224, processor 320, communication interface 370, and/or the like) may receive test parameters associated with testing an application that utilizes source data, as described above in connection with FIGS. 1A-2.

As further shown in FIG. 4, process 400 may include causing one or more source containers to be temporarily created in a cloud computing environment, based on the test parameters (block 420). For example, the testing platform (e.g., using computing resource 224, processor 320, memory 330, communication interface 370, and/or the like) may cause one or more source containers to be temporarily created in a cloud computing environment, based on the test parameters, as described above in connection with FIGS. 1A-2.

As further shown in FIG. 4, process 400 may include providing the source data to the one or more source containers in the cloud computing environment (block 430). For example, the testing platform (e.g., using computing resource 224, processor 320, storage component 340, communication interface 370, and/or the like) may provide the source data to the one or more source containers in the cloud computing environment, as described above in connection with FIGS. 1A-2.

As further shown in FIG. 4, process 400 may include causing one or more other containers, for the application, to be temporarily created in the cloud computing environment, based on the test parameters (block 440). For example, the testing platform (e.g., using computing resource 224, processor 320, memory 330, communication interface 370, and/or the like) may cause one or more other containers, for the application, to be temporarily created in the cloud computing environment, based on the test parameters, as described above in connection with FIGS. 1A-2.

As further shown in FIG. 4, process 400 may include creating a file for testing the application with the one or more source containers and the one or more other containers (block 450). For example, the testing platform (e.g., using computing resource 224, processor 320, memory 330, and/or the like) may create a file for testing the application with the one or more source containers and the one or more other containers, as described above in connection with FIGS. 1A-2.

As further shown in FIG. 4, process 400 may include causing the application to be executed with the one or more source containers and the one or more other containers, based on the file (block 460). For example, the testing platform (e.g., using computing resource 224, processor 320, storage component 340, and/or the like) may cause the application to be executed with the one or more source containers and the one or more other containers, based on the file, as described above in connection with FIGS. 1A-2.

As further shown in FIG. 4, process 400 may include receiving results associated with executing the application with the one or more source containers and the one or more other containers (block 470). For example, the testing platform (e.g., using computing resource 224, processor 320, communication interface 370, and/or the like) may receive results associated with executing the application with the one or more source containers and the one or more other containers, as described above in connection with FIGS. 1A-2.

Process 400 may include additional implementations, such as any single implementation or any combination of implementations described below and/or described with regard to any other process described herein.

In some implementations, the testing platform may determine whether the results associated with executing the application are valid based on a comparison with expected results, and may perform one or more actions based on determining whether the results associated with executing the application are valid. In some implementations, the testing platform may determine whether the results associated with executing the application are valid based on a comparison with expected results, and may provide information indicating the results associated with executing the application and information indicating whether the results are valid.

In some implementations, the testing platform may cause the one or more source containers and the one or more other containers to be removed from the cloud computing environment after the results associated with executing the application are received. In some implementations, the testing platform may determine that the results associated with executing the application are valid based on a comparison with expected results, and may cause the one or more source containers and the one or more other containers to be removed from the cloud computing environment after the results associated with executing the application are determined to be valid.

In some implementations, the testing platform may determine that the results associated with executing the application are not valid based on a comparison with expected results, may modify the application, based on determining that the results associated with executing the application are not valid, to generate a modified application, may cause the modified application to be executed with the one or more source containers and the one or more other containers, based on the file, and may receive results associated with executing the modified application with the one or more source containers and the one or more other containers. In some implementations, the application may include a microservice application.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 for testing an application in a production infrastructure temporarily provided by a cloud computing environment and for performing an action based on the testing. In some implementations, one or more process blocks of FIG. 5 may be performed by a testing platform (e.g., testing platform 220). In some implementations, one or more process blocks of FIG. 5 may be performed by another device or a group of devices separate from or including the testing platform, such as a user device (e.g., user device 210).

As shown in FIG. 5, process 500 may include causing one or more source containers to be temporarily created in a cloud computing environment, based on test parameters associated with testing an application (block 510). For example, the testing platform (e.g., using computing resource 224, processor 320, communication interface 370, and/or the like) may cause one or more source containers to be temporarily created in a cloud computing environment, based on test parameters associated with testing an application, as described above in connection with FIGS. 1A-2.

As further shown in FIG. 5, process 500 may include providing source data to the one or more source containers in the cloud computing environment (block 520). For example, the testing platform (e.g., using computing resource 224, processor 320, storage component 340, communication interface 370, and/or the like) may provide source data to the one or more source containers in the cloud computing environment, as described above in connection with FIGS. 1A-2.

As further shown in FIG. 5, process 500 may include causing one or more other containers, for the application, to be temporarily created in the cloud computing environment, based on the test parameters (block 530). For example, the testing platform (e.g., using computing resource 224, processor 320, memory 330, communication interface 370, and/or the like) may cause one or more other containers, for the application, to be temporarily created in the cloud computing environment, based on the test parameters, as described above in connection with FIGS. 1A-2.

As further shown in FIG. 5, process 500 may include creating a file for testing the application with the one or more source containers and the one or more other containers (block 540). For example, the testing platform (e.g., using computing resource 224, processor 320, memory 330, and/or the like) may create a file for testing the application with the one or more source containers and the one or more other containers, as described above in connection with FIGS. 1A-2.

As further shown in FIG. 5, process 500 may include causing the application to be executed with the one or more source containers and the one or more other containers, based on the file, to generate results associated with executing the application (block 550). For example, the testing platform (e.g., using computing resource 224, processor 320, communication interface 370, and/or the like) may cause the application to be executed with the one or more source containers and the one or more other containers, based on the file, to generate results associated with executing the application, as described above in connection with FIGS. 1A-2.

As further shown in FIG. 5, process 500 may include performing one or more actions based on the results associated with executing the application (block 560). For example, the testing platform (e.g., using computing resource 224, processor 320, memory 330, communication interface 370, and/or the like) may perform one or more actions based on the results associated with executing the application, as described above in connection with FIGS. 1A-2.

Process 500 may include additional implementations, such as any single implementation or any combination of implementations described below and/or described with regard to any other process described herein.

In some implementations, the testing platform may determine whether the results associated with executing the application are valid based on a comparison with expected results, and may perform the one or more actions based on determining whether the results associated with executing the application are valid. In some implementations, the testing platform may determine whether the results associated with executing the application are valid based on a comparison with expected results, and may provide information indicating the results associated with executing the application and information indicating whether the results are valid.

In some implementations, the testing platform may cause the one or more source containers and the one or more other containers to be removed from the cloud computing environment after the one or more actions are performed. In some implementations, the testing platform may determine that the results associated with executing the application are valid based on a comparison with expected results, and may cause the one or more source containers and the one or more other containers to be removed from the cloud computing environment after the results associated with executing the application are determined to be valid.

In some implementations, the testing platform may determine that the results associated with executing the application are not valid based on a comparison with expected results, may modify the application, based on determining that the results associated with executing the application are not valid, to generate a modified application, and may cause the modified application to be executed with the one or more source containers and the one or more other containers, based on the file, to generate results associated with executing the modified application. In some implementations, the application may include a micro-service application.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for testing an application in a production infrastructure temporarily provided by a cloud computing environment and for validating the testing. In some implementations, one or more process blocks of FIG. 6 may be performed by a testing platform (e.g., testing platform 220). In some implementations, one or more process blocks of FIG. 6 may be performed by another device or a group of devices separate from or including the testing platform, such as a user device (e.g., user device 210).

As shown in FIG. 6, process 600 may include causing one or more first containers to be created in a cloud computing environment based on test parameters associated with testing an application that utilizes source data (block 610). For example, the testing platform (e.g., using computing resource 224, processor 320, communication interface 370, and/or the like) may cause one or more first containers to be created in a cloud computing environment based on test parameters associated with testing an application that utilizes source data, as described above in connection with FIGS. 1A-2.

As further shown in FIG. 6, process 600 may include providing the source data to the one or more first containers in the cloud computing environment (block 620). For example, the testing platform (e.g., using computing resource 224, processor 320, storage component 340, and/or the like) may provide the source data to the one or more first containers in the cloud computing environment, as described above in connection with FIGS. 1A-2.

As further shown in FIG. 6, process 600 may include causing one or more second containers, for the application, to be created in the cloud computing environment, based on the test parameters (block 630). For example, the testing platform (e.g., using computing resource 224, processor 320, communication interface 370, and/or the like) may cause one or more second containers, for the application, to be created in the cloud computing environment, based on the test parameters, as described above in connection with FIGS. 1A-2.

As further shown in FIG. 6, process 600 may include causing the application to be tested based on executing the application with the one or more first containers and the one or more second containers (block 640). For example, the testing platform (e.g., using computing resource 224, processor 320, memory 330, communication interface 370, and/or the like) may cause the application to be tested based on executing the application with the one or more first containers and the one or more second containers, as described above in connection with FIGS. 1A-2.

As further shown in FIG. 6, process 600 may include receiving results associated with executing the application with the one or more first containers and the one or more second containers (block 650). For example, the testing platform (e.g., using computing resource 224, processor 320, communication interface 370, and/or the like) may receive results associated with executing the application with the one or more first containers and the one or more second containers, as described above in connection with FIGS. 1A-2.

As further shown in FIG. 6, process 600 may include determining whether the results associated with executing the application are valid based on a comparison with expected results (block 660). For example, the testing platform (e.g., using computing resource 224, processor 320, memory 330, and/or the like) may determine whether the results associated with executing the application are valid based on a comparison with expected results, as described above in connection with FIGS. 1A-2.

Process 600 may include additional implementations, such as any single implementation or any combination of implementations described below and/or described with regard to any other process described herein.

In some implementations, the testing platform may perform one or more actions based on determining whether the results associated with executing the application are valid. In some implementations, the testing platform may cause the one or more first containers and the one or more second containers to be removed from the cloud computing environment after the results associated with executing the application are received. In some implementations, the results associated with executing the application may be determined to be valid, and the testing platform may cause the one or more first containers and the one or more second containers to be removed from the cloud computing environment after the results associated with executing the application are determined to be valid.

In some implementations, the testing platform may provide, to a user device, information indicating the results associated with executing the application and information indicating whether the results are valid. In some implementations, the results associated with executing the application may be determined to be invalid, and the testing platform may modify the application to generate a modified application, may cause the modified application to be executed with the one or more first containers and the one or more second containers, and may receive results associated with executing the modified application with the one or more first containers and the one or more second containers.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Some implementations described herein provide a testing platform that tests an application in a production infrastructure temporarily provided by a cloud computing environment. For example, the testing platform may receive test parameters associated with testing an application that utilizes source data, and may cause source containers, for the source data, to be temporarily created in a cloud computing environment, based on the test parameters. The testing platform may provide the source data to the source containers in the cloud computing environment, and may cause other containers, for the application, to be temporarily created in the cloud computing environment, based on the test parameters. The testing platform may create a file for testing the application with the source containers and the other containers, based on the test parameters, and may cause the application to be executed with the source containers and the other containers, based on the file. The testing platform may receive results associated with executing the application with the source containers and the other containers.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memories; and
one or more processors, communicatively coupled to the one or more memories, to:
  receive test parameters associated with testing an application that utilizes source data,
    wherein the test parameters include parameters indicating an application type, a location of the application, a source data location of the source data, one or more tests to perform on the application, and a list of physical infrastructure to be temporarily simulated for testing the application;
  cause one or more source containers, for the source data, to be temporarily created in a cloud computing environment, based on the test parameters;
  provide the source data to the one or more source containers;
  cause one or more other containers, for the application, to be temporarily created in the cloud computing environment, based on the test parameters;
  create a file for testing the application with the one or more source containers and the one or more other containers, based on the test parameters;
  cause the application to be executed with the one or more source containers and the one or more other containers, based on the file; and
  cause the one or more source containers, and the one or more other containers, to be removed from the cloud computing environment after execution of the application.

2. The device of claim 1, wherein the one or more processors, when causing the one or more source containers to be temporarily created, are to:
  cause the one or more source containers to be created on a computing resource included in the cloud computing environment, and
  wherein the one or more processors, when causing the one or more other containers to be temporarily created, are to:
    cause the one or more other containers to be created on the computing resource.

3. The device of claim 2, wherein the one or more source containers and the one or more other containers share an operating system kernel associated with the computing resource.

4. The device of claim 1, wherein the one or more processors, when providing the source data to the one or more source containers, are to:

provide a first portion of the source data to a first container of the one or more source containers, and provide a second portion of the source data to a second container of the one or more source containers.

5. The device of claim 1, wherein the test parameters specify infrastructure to be implemented in the one or more other containers.

6. The device of claim 5, wherein the one or more processors, when causing the one or more other containers to be temporarily created, are to:

cause the infrastructure, specified by the test parameters, to be implemented by the one or more other containers.

7. The device of claim 1, wherein the one or more processors, when causing the one or more other containers to be temporarily created, are to:

cause the one or more other containers to implement one or more server devices.

8. A non-transitory computer-readable medium storing instructions, the instructions comprising:

one or more instructions that, when executed by one or more processors of a device, cause the one or more processors to:

receive test parameters associated with testing an application that utilizes source data, wherein the test parameters include parameters indicating an application type, a location of the application, a source data location of the source data, one or more tests to perform on the application, and a list of physical infrastructure to be temporarily simulated for testing the application;

cause one or more source virtual machines, for the source data, to be temporarily created in a cloud computing environment, based on the test parameters;

provide the source data to the one or more source virtual machines in the cloud computing environment;

cause one or more other virtual machines, for the application, to be temporarily created in the cloud computing environment, based on the test parameters;

create a file for testing the application with the one or more source virtual machines and the one or more other virtual machines, based on the test parameters;

cause the application to be executed with the one or more source virtual machines and the one or more other virtual machines, based on the file; and cause the one or more source virtual machines, and the one or more other virtual machines, to be removed from the cloud computing environment after execution of the application.

9. The non-transitory computer-readable medium of claim 8, wherein the instructions further comprise:

one or more instructions that, when executed by the one or more processors, cause the one or more processors to:

provide data indicating a recommended modification to the test parameters based on results associated with executing the application.

10. The non-transitory computer-readable medium of claim 8, wherein the instructions further comprise:

one or more instructions that, when executed by the one or more processors, cause the one or more processors to:

determine whether results associated with executing the application are valid based on a comparison of the results with expected results; and perform one or more actions based on determining whether the results associated with executing the application are valid.

11. The non-transitory computer-readable medium of claim 10, wherein the one or more instructions, that cause the one or more processors to perform one or more actions, further cause the one or more processors to:

provide information indicating the results associated with executing the application and information indicating whether the results are valid.

12. The non-transitory computer-readable medium of claim 10, wherein the one or more instructions, that cause the one or more processors to perform one or more actions, further cause the one or more processors to:

modify the application, based on determining that the results associated with executing the application are not valid, to generate a modified application; and cause the modified application to be executed with the one or more source virtual machines and the one or more other virtual machines, based on the file.

13. The non-transitory computer-readable medium of claim 12, wherein the instructions further comprise:

one or more instructions that, when executed by the one or more processors, cause the one or more processors to:

provide first information indicating the results associated with executing the application; and provide second information indicating the results associated with executing the modified application.

14. The non-transitory computer-readable medium of claim 8, wherein the instructions further comprise:

one or more instructions that, when executed by the one or more processors, cause the one or more processors to:

modify the application, based on output from an artificial intelligence technique, to generate a modified application; and cause the modified application to be executed with the one or more source virtual machines and the one or more other virtual machines, based on the file.

15. A method, comprising:

receiving, by a device, test parameters associated with testing an application that utilizes source data, wherein the test parameters include parameters indicating an application type, a location of the application, a source data location of the source data, one or more tests to perform on the application, and a list of physical infrastructure to be temporarily simulated for testing the application;

causing source infrastructure, for the source data, to be temporarily created in a cloud computing environment, based on the test parameters;

providing, by the device, the source data to the source infrastructure in the cloud computing environment;

causing, by the device, other infrastructure, for the application, to be temporarily created in the cloud computing environment, based on the test parameters;

creating, by the device, a file for testing the application with the source infrastructure and the other infrastructure, based on the test parameters;

causing, by the device, the application to be executed with the source infrastructure and the other infrastructure, based on the file; and causing, by the device, the source infrastructure, and the other infrastructure, to be removed from the cloud computing environment after execution of the application.

16. The method of claim 15, further comprising:
receiving results associated with execution of the application; and
determining whether the results are valid.

17. The method of claim 16, wherein the results include at least one of:
information indicating errors generated by the application during execution of the application,
information specifying loads encountered by the source infrastructure during execution of the application,
information specifying loads encountered by the other infrastructure during execution of the application,
information specifying resource utilization during execution of the application, or
information specifying a quantity of time associated with execution of the application.

18. The method of claim 16, wherein determining whether the results are valid comprises at least one of:
comparing a quantity of errors to an expected quantity of errors,
comparing loads encountered by the source infrastructure to an expected source infrastructure load,
comparing loads encountered by the other infrastructure to an expected other infrastructure load,
comparing resource utilization to an expected resource utilization, or
comparing a quantity of time to an expected quantity of time.

19. The method of claim 16, wherein determining whether the results are valid comprises:
determining that the results are not valid; and
wherein the method further comprises:
providing data indicating a recommended modification to the test parameters based on determining that the results are not valid.

20. The method of claim 15, wherein the source infrastructure and other infrastructure include at least one container and at least one virtual machine.

* * * * *